United States Patent [19]

Salloum et al.

[11] 3,933,387

[45] Jan. 20, 1976

[54] THERMOFORMED PLASTIC ENERGY ABSORBER FOR VEHICLES

[75] Inventors: Robert J. Salloum; Raymond H. Hodges, both of Sterling Heights, Mich.

[73] Assignee: General Motors Corporation, Detroit, Mich.

[22] Filed: Mar. 10, 1975

[21] Appl. No.: 556,586

[52] U.S. Cl................. 293/71 R; 293/88; 267/140; 114/219
[51] Int. Cl.²........................................ B60R 19/08
[58] Field of Search................. 293/71 R, 70, 88, 1; 114/219; 267/139, 140, 141

[56] References Cited
UNITED STATES PATENTS

| | | | |
|---|---|---|---|
| 3,506,295 | 4/1970 | Yancey | 293/70 |
| 3,863,909 | 2/1975 | Weber | 267/140 |
| 3,871,636 | 3/1975 | Boyle | 267/140 |

Primary Examiner—Stanley H. Tollberg
Assistant Examiner—Charles A. Marmor
Attorney, Agent, or Firm—Charles R. White

[57] ABSTRACT

Energy absorbing media for vehicle bumpers and other vehicular components comprising stacked energy absorbing layers each formed by a pair of sheets of thin plastic material secured together. Each sheet has rows of spaced projections formed therein which interlock with the rows of spaced projections of the mating sheet. The projections flex in directions parallel and perpendicular to the bases of the sheets in response to impact to absorb impact energy.

4 Claims, 7 Drawing Figures

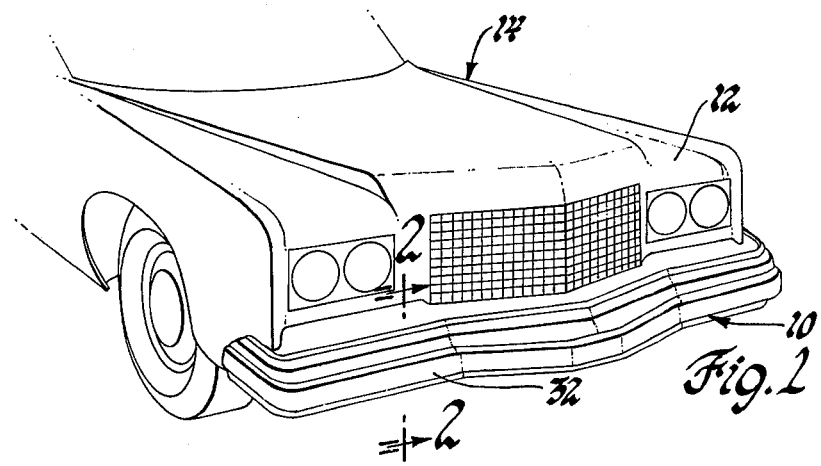
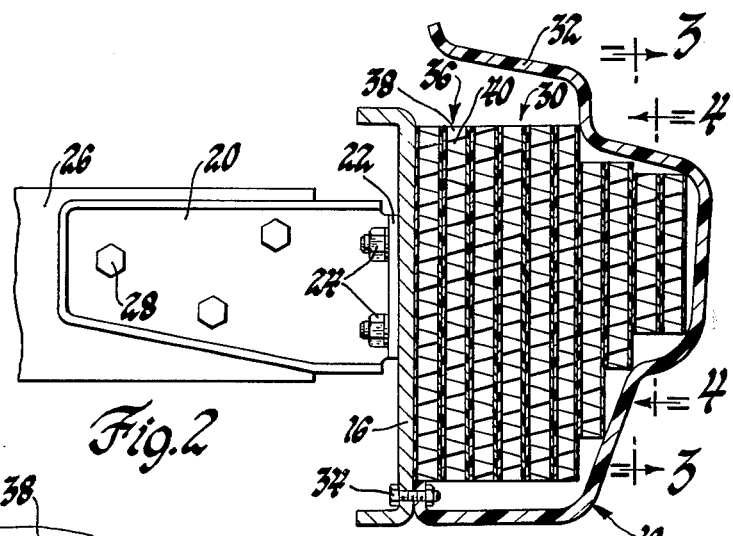
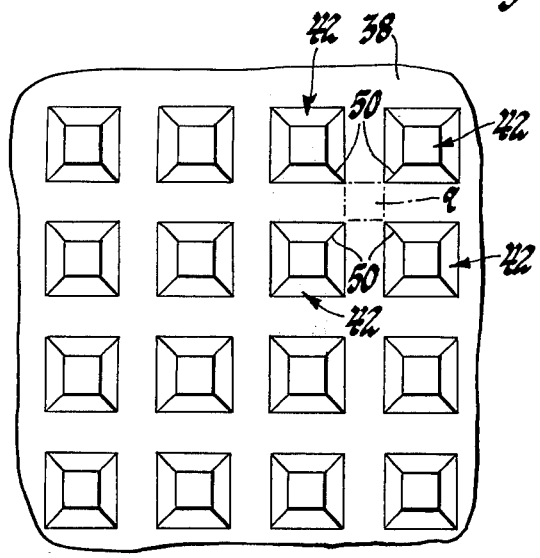
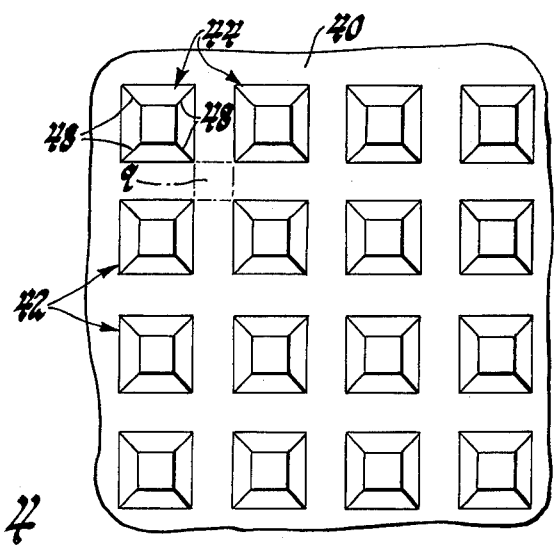

THERMOFORMED PLASTIC ENERGY ABSORBER FOR VEHICLES

This invention relates to energy absorbers for vehicles and more particularly to a new improved self-restoring energy absorber comprising layered sheets of plastic stock having a plurality of projections which intermesh and mutually support each other and which deflect in response to an impact to absorb impact energy.

Many current automotive vehicles have energy absorbing devices that enable them to withstand low speed front and rear impacts without damage to the vehicle bodywork and vehicle components such as the suspension. As the state of this art has progressed, there has been increasing utilization of resilient plastic structures as an energy absorbing medium. In one prior art construction a rigid external bumper supports a plurality of discrete outwardly-extending energy absorbing blocks of resilient plastic material each having rows of deep longitudinally-extending cells which deflect on impact to absorb impact energy. In another prior art system a unitary multicelled plastic energy absorber grid, supported on special bracket construction internally of the vehicle body and covered by a plastic external facia to simulate vehicle body work, is used to absorb impact energy.

While these prior art systems are generally satisfactory and successfully manage low-speed impact energy, the material and manufacturing expense of the cellular energy absorbing media adds substantially to vehicle costs and is therefore not generally satisfactory for use on economy type vehicles.

The energy absorber of this invention comprises a plurality of extruded thin-walled sheets of relatively inexpensive plastic material such as low density polyethylene copolymers of ethylene and vinylacetate and blends of polyethylene and ethylene-propylene rubber. Substantially identical projections are thermoformed in these sheets which are in rows and are spaced predetermined distances from each other. The projections are in a pattern which permits their intermeshing or interlocking when the sheets are sandwiched in a face to face relationship. In the preferred embodiment the thermoformed projections are in the shape of truncated pyramids spaced around design quadrilaterals in each sheet. When the sheets are brought together, the pyramids of each sheet will project onto the design quadrilateral of the opposing sheet and there is contact by the edges or sides of the pyramids of one sheet with the edges or sides of the surrounding pyramids of the opposing sheet to provide mutual support for each other. After being intermeshed, the two sheets are heat sealed together at the top of each pyramid to provide a basic energy absorbing layer.

Building from a first basic layer additional layers, similar to the first layer of cooperating sheets of pyramids, are easily secured in sequence to form an energy absorbing unit of any desired and practical thickness. After building the layers of pyramids into a block like configuration, shaping can be readily obtained by cutting the block into a desired contour if necessary.

The energy absorbing block is secured to a rigid support such as the bumper beam of a vehicle bumper assembly and may be covered by plastic facia to protect the energy absorber from foreign matter and provide a finely finished appearance for the vehicle.

When impacted, the pyramids in the impact zone will mutually support each other and experience side to side and top to bottom deflection, preferably simultaneously, to absorb impact energy. The plastic thermoformable material utilized in making the energy absorber will function with high efficiency over a wide range of temperatures including subfreezing temperatures to absorb impact energy. After being impacted, the pyramids will substantially recover to their original shapes without any appreciable damage so that the integrity and appearance of the bumper assembly is maintained.

A feature, object and advantage of this invention is to provide a new and improved low cost energy absorbing layer of cooperating plastic sheet material having thermoformable interlocking projections which have limited side to side contact with each other and which deflect in response to an impact load applied thereto to absorb impact energy.

Another feature, object and advantage of this invention is to provide a new and improved lightweight energy management medium for vehicles which comprises a plurality of sheets of plastic material having layers of intermeshed projections which deflect to absorb impact energy with high efficiency and which progressively recover after deflection and return to their original configuration.

Another feature, object and advantage of this invention is to provide a new and improved energy management medium for vehicles which is economical to produce and is made from a thermoformable polymeric material and which has a plurality of rows of intermeshing truncated pyramids that can be used in bumper and other vehicle applications to absorb energy of impact.

These and other objects, features and advantages of the invention will be more apparent from the following detailed description and drawings in which:

FIG. 1 is a perspective view of the front portion of an automotive vehicle incorporating this invention;

FIG. 2 is a sectional view taken along lines 2—2 of FIG. 1;

FIG. 3 is a sectional view taken along lines 3—3 of FIG. 2;

FIG. 4 is a view taken along line 4—4 of FIG. 2;

Figure 5:
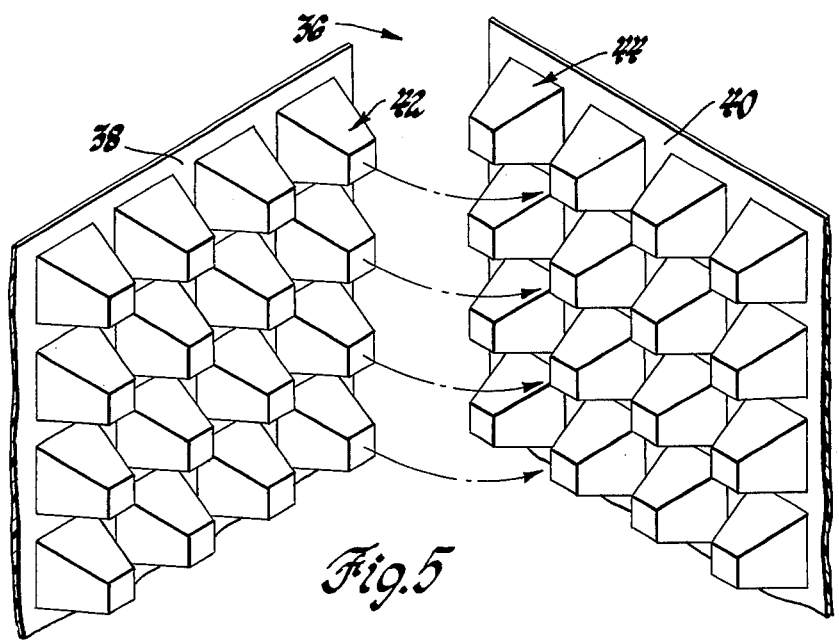
FIG. 5 is a perspective view of sheets of plastic material with projections formed therein.

Turning now in greater detail to the drawings, there is shown an energy absorbing bumper assembly 10 that extends horizontally across the front of the body 12 of a vehicle 14. Bumper assembly 10 comprises an elongated steel bumper beam 16 disposed externally of the vehicle which is rigidly connected to the vehicle by a pair of mounting brackets 20 of which only one is shown. Each mounting bracket is L-shaped and has a flange 22 which fits against the rear of the bumper beam and is secured thereto by bolt and nut fasteners 24. The main body portion of each bracket extends generally at right angles with respect to flange 22 and fits against an associated side rail 26 of the vehicle frame and is rigidly secured thereto by bolt and nut fasteners 28. A flexible energy absorber assembly 30 is bonded or otherwise secured to the outer face of the bumper beam 16 and extends across the entire width of the vehicle. This energy absorber assembly is covered by a thin walled and contoured flexible plastic facia 32 which may be color matched with the vehicle body work or suitably coated to simulate a conventional bright work bumper. This plastic facia protects the energy absorber assembly from foreign matter such as dirt and water and provides a finished appearance for the vehicle. The facia may be secured to the bumper beam and to the vehicle body work by any suitable means such as by fasteners 34.

The energy absorber assembly 30 is comprised of a plurality of energy absorbing layers 36 each comprising a pair of thin wall sheets 38 and 40 of polymeric material which are heat welded together. As best shown in FIGS. 3 and 4 sheets 38 and 40 each have a plurality of projections 42 and 44 thermoformed in horizontally and vertically extending rows. In a first form of the invention the projections 44 are in the shape of identical truncated pyramids arranged in a repeating pattern. Preferably, the length and width of the sides of each pyramid are equal to each other and equal to the height of the pyramid. As shown in FIGS. 3 and 4 the orientations of the pyramids of each sheet are identical. Each sheet has a plurality of basic groups of pyramids comprising four adjacent pyramids disposed around a design quadrilateral q with zero offset from the corners thereof. With this pyramid arrangement the sheets can be readily assembled together as shown in FIG. 5 so that the pyramids interlock with each other. The pyramids of each sheet project onto the design quadrilateral of the opposing sheet and the edges of each pyramid will contact the corresponding edges of the surrounding four pyramids. For example the four edges 48 of the pyramid identified by reference numeral 44 of sheet 40 will contact corresponding edges 50 of the basic group of four pyramids 42 of sheet 38. After the sheets are assembled with the pyramids interlocked, the sheets are heat welded together to retain the pyramids 42 and 44 in a common plane between the bases of the sheets 38 and 40. After heat welding a plurality of layers 36 are assembled and joined together by heat sealing or by other suitable fastening means to build an entire array to form the energy absorbers assembly 30 illustrated in FIG. 2. The energy absorber 30 is suitably secured onto the outer face of bumper beam 16 and extends entirely across the front of the vehicle.

The assembled layers of intermeshed truncated pyramids provide an improved energy management media which has high efficiency in absorbing the energy of an impact load directed on the bumper assembly and possesses good recovery or memory for a wide range of temperature variations. Assuming that the vehicle incorporating the bumper assembly 10 is traveling at a predetermined speed such as 5 mph and strikes a barrier, the energy absorber will be deflected and reduced in overall volume by the impact force.

The specific energy absorbed by the pyramids varies according to pyramid size. Tests have shown that ½ inch pyramids absorb greater amounts of energy at strains beyond 20% as compared to ⅜, ¾ and 1 inch pyramids since the force required to crush a pyramid is dependent on the thickness.

Figure 6:
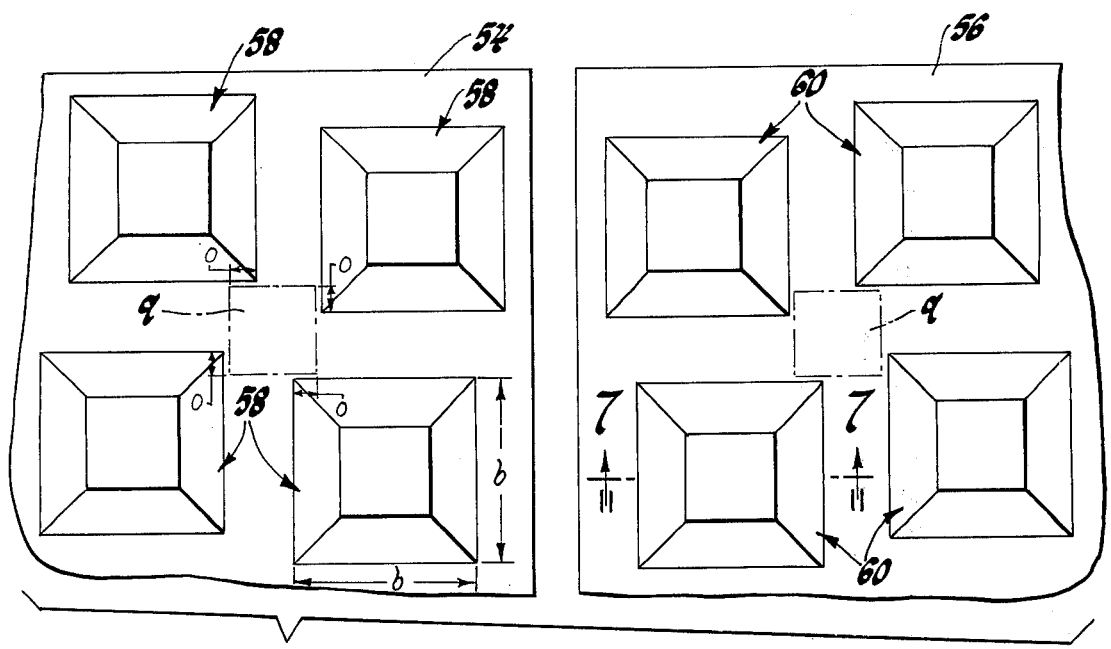
FIG. 6 is a top plan view illustrating another embodiment of this invention showing different orientations of the projections formed in the plastic sheet material.

Instead of using identical pyramid patterns with zero offset from the design quadrilateral as in FIGS. 3 and 4 other patterns may be selected to provide energy absorbing layers with good energy absorbing and recovery characteristics. In FIG. 6 for example a pair of separate sheets 54 and 56 are shown each with groups of four identical pyramids 58 and 60 respectively which are offset from their design quadrilateral $q$ by a predetermined distance $o$. The pyramid pattern of sheet 56 is a mirror image of the pyramid pattern of sheet 54. With the pyramids offset from the corners of the design quadrilateral as illustrated the sheets 54 and 56 can be assembled together in a manner similar to that of FIG. 5. When assembled the pyramids of each sheet project onto the corresponding design quadrilaterals of the opposing sheet. The design quadrilaterals are properly dimensioned so that each side face of each pyramid will be in partial contact with the corresponding side face of a surrounding pyramid instead of edge to edge contact as with the pyramid orientation of FIGS. 3 and 4. With this offset pyramid array there is increased mutual support of the pyramids which provides for higher energy absorption at equal strains as compared to the pyramid arrangement shown in FIGS. 3 and 4. Sheets 54 and 56 can be heat welded together at the juncture of the tops of the pyramids and the adjacent sheet as illustrated at $w$ in FIG. 7.

Figure 7:
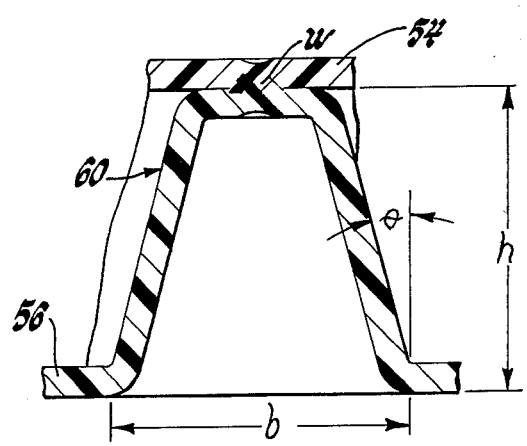
FIG. 7 is a sectional view of one of the thermoformed projections taken generally along line 7—7 of FIG. 6 and modified to illustrate the heat welding of the projection to adjacent plastic sheet material.

Also as shown in FIG. 7 the sides of the pyramids have a small inclination, preferably around 15° for ½ inch pyramids having a material density of 12 lbs./ft$^3$ to provide for an optimum amount of energy absorption. As in the first embodiment the sides of the pyramids are equal and the base line dimensions $b$ are equal to pyramid height $h$. Maximum energy absorption will occur when the pyramid walls are flexed simultaneously side to side and lengthwise. If the height $h$ is greater than the baseline dimension $b$, flexure will occur mostly in the direction of $h$. If the baseline dimension $b$ is greater than pyramid height $h$ flexure will occur mostly in a direction parallel with the base.

As in the first embodiment the plurality of layers formed from the sheets 54 and 56 are built up and heat welded together to form a flexible energy absorbing assembly which can be mounted on the bumper beam and covered by a facia of resilient plastic material.

While this invention has been illustrated and described as employing pyramids with a square design quadrilateral, pyramids having a rectangular design quadrilateral may also be used. Additionally projections having shapes other than pyramids may be used. Accordingly, the scope of this invention is set forth in the following claims.

We claim:

1. A resilient energy absorber operatively mounted on a rigid support of a vehicle comprising a first thin sheet of plastic material, said sheet having a plurality of projections equal in size and spaced a predetermined distance from each other in a plurality of rows to form a first pattern, a second thin wall sheet of plastic material, said second sheet having a plurality of projections equal in size and spaced a predetermined distance from each other in a plurality of rows to form a second pattern, said first sheet being operatively mounted on said second sheet with the projections of said first sheet fitting into the spaces between the projections of said second sheet, each of said projections of said first sheet having contact with the surrounding projections of said second sheet whereby an impact force directed onto said energy absorber deflects said projections of said first and second sheets and said projections flex to absorb the energy of said impact force.

2. A resilient energy absorbing bumper system for a vehicle comprising a rigid bumper support secured to the vehicle, a resilient energy absorber mounted on said support and extending outwardly therefrom, said energy absorbing comprising first and second sheet means of resilient thin walled plastic material disposed in a face to face relationship with respect to each other, each of said sheet means comprising a base and a plurality of rows of spaced projections extending therefrom, said rows of said projections of said first sheet extending between the rows of projections of said second sheet means, said projections of said first sheet means being surrounded by predetermined projections of said second sheet means, said projections of said sheet means having planar side wall means which contact each other and which flex in response to the force of the impact load directed on said resilient energy absorber means to absorb the energy of said impact force.

3. A resilient impact energy absorber for providing impact protection for a vehicle and disposed on a rigid support secured to the vehicle comprising a resilient energy absorbing media mounted on said rigid support and extending outwardly therefrom for absorbing the energy of a predetermined impact of said vehicle, said energy absorbing media comprising first and second sheet means of resilient polymer material secured in face to face relationship to each other, said first sheet means having a base and a plurality of projections extending from said base toward said second sheet means, said projections being disposed in a plurality of rows and spaced from each other to form a first pattern, said second sheet means having a base and a plurality of projections extending from said base thereof toward said base of said first sheet means and said last recited projections being disposed in a plurality of rows and spaced from each other to form a second pattern of said projections, said second pattern being a mirror image of said first pattern, said projections of said sheet means interlocking with each other between the rows thereof and being disposed in a common plane between said bases of said sheets, said projections of said first and second sheets having side portions which contact each other and which flex in response to an impact force applied to said energy absorber to absorb the energy of said impact force.

4. A resilient impact energy absorber for providing impact protection for a vehicle and operatively mounted on a rigid bumper beam supported by said vehicle, said energy absorber comprising a plurality of discrete energy absorbing layers stacked on top of one another to a predetermined thickness, each of said layers comprising first and second sheets of resilient plastic material secured in face to face relationship with respect to each other, said first sheet of each layer having a base and a plurality of integral thin walled projections thermoformed therein, extending toward said second sheet, said projections being spaced from each other and being disposed in a plurality of spaced rows, said second sheet of each layer having a base and a plurality of integral thin walled projections thermoformed therein extending from said base thereof toward the base of said first sheet means, said last mentioned projections being spaced from each other and being disposed in a plurality of spaced rows, said projections of said first and second sheets interlocking with each other and being disposed in a common plane equal to the height of one of said projections, means joining said sheets of each of said layers together, said projections being in the form of truncated pyramids, said pyramids of said first sheet contacting portions of predetermined pyramids of said second sheet, said pyramids flexing in response to an impact force applied to said energy absorber to absorb impact energy, and a plastic facia covering said energy absorber.

* * * * *